(12) United States Patent
Baek et al.

(10) Patent No.: US 10,313,857 B2
(45) Date of Patent: Jun. 4, 2019

(54) METHOD FOR DEVICE TO CONTROL ANOTHER DEVICE AND THE DEVICE

(71) Applicant: SAMSUNG ELECTRONICS CO., LTD., Suwon-si (KR)

(72) Inventors: Yun-sun Baek, Suwon-si (KR); Yong-tae Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 81 days.

(21) Appl. No.: 14/933,117

(22) Filed: Nov. 5, 2015

(65) Prior Publication Data

US 2016/0127851 A1 May 5, 2016

(30) Foreign Application Priority Data

Nov. 5, 2014 (KR) .................. 10-2014-0152857

(51) Int. Cl.
*H04W 4/02* (2018.01)
*H04W 4/40* (2018.01)
*H04W 4/48* (2018.01)
*H04W 4/70* (2018.01)
*H04W 4/029* (2018.01)

(52) U.S. Cl.
CPC ............. *H04W 4/70* (2018.02); *H04W 4/025* (2013.01); *H04W 4/029* (2018.02); *H04W 4/40* (2018.02); *H04W 4/48* (2018.02)

(58) Field of Classification Search
CPC ...... H04W 4/005–4/006; H04W 4/025–4/046; H04W 84/18; H04L 67/12–67/125; H04L 67/148
See application file for complete search history.

(56) References Cited

U.S. PATENT DOCUMENTS

| | | | |
|---|---|---|---|
| 8,170,186 B2 | 5/2012 | Kuiken | |
| 8,503,932 B2 | 8/2013 | Demuynck et al. | |
| 2010/0124949 A1* | 5/2010 | Demuynck | G06F 1/1626 |
| | | | 455/569.1 |
| 2013/0210406 A1* | 8/2013 | Vidal | H04W 4/00 |
| | | | 455/418 |
| 2014/0359477 A1* | 12/2014 | Chen | H04L 67/1095 |
| | | | 715/748 |
| 2015/0061891 A1* | 3/2015 | Oleson | H04W 4/008 |
| | | | 340/870.16 |

\* cited by examiner

*Primary Examiner* — Eric Myers
(74) *Attorney, Agent, or Firm* — Sughrue Mion, PLLC

(57) ABSTRACT

The present disclosure relates to a sensor network, Machine Type Communication (MTC), Machine-to-Machine (M2M) communication, and technology for Internet of Things (IoT). The present disclosure may be applied to intelligent services based on the above technologies, such as smart home, smart building, smart city, smart car, connected car, health care, digital education, smart retail, security and safety services. The present disclosure relates to control a client device using a server device based on context data indicating a circumstance of a user.

17 Claims, 12 Drawing Sheets

METHOD FOR DEVICE TO CONTROL ANOTHER DEVICE AND THE DEVICE

RELATED APPLICATION

This application claims priority from Korean Patent Application No. 10-2014-0152857, filed on Nov. 5, 2014, in the Korean Intellectual Property Office, the disclosure of which is incorporated herein by reference in its entirety.

BACKGROUND

1. Field

One or more exemplary embodiments relate to a method of controlling a device via another device.

2. Description of the Related Art

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

SUMMARY

One or more exemplary embodiments include a method and device for controlling a mirroring service between a device and another device, in consideration of a user's circumstance.

Additional aspects of the exemplary embodiments will be set forth in part in the description which follows and, in part, will be apparent from the description, or may be learned by practice of the presented exemplary embodiments.

According to an aspect of an exemplary embodiment, a method of controlling a client device using a server device includes obtaining, by a server device, context data indicating a circumstance of a user from a first client device; determining an event by comparing the obtained context data and pre-stored user information; and transferring information about an object that is output from the server device to a second client device, based on the determined event.

When the determined event is a first event, the method may further include generating a mirroring session for performing a mirroring service, and transferring the information about the object may further include transferring the information about the object using the generated mirroring session.

Obtaining the context data may further include obtaining the context data from the first client device according to a pre-configured cycle, and the pre-configured cycle may be changed based on the event.

Determining the event may further include: determining a movement of the user from the obtained context data; and predicting the event, based on the determined movement of the user.

Transferring the information about the object may further include: determining an operation corresponding to the determined event, using an application that is executed when the event is determined; changing the object that is output from the server device, according to the determined operation; and transferring information about the changed object to the second client device.

The pre-stored user information may further include information indicating a relation between the event and the obtained context data.

The method may further include generating a pattern of context data corresponding to event, based on input information corresponding to the event obtained via the server device from the user, and context data obtained at a time corresponding to the event.

The method may further include detecting the second client device by the server device at a detection time, and obtaining the context data may further include obtaining the context data at the detection time.

The method may further include determining whether the user is a pre-registered user using the obtained context data.

According to another aspect of an exemplary embodiment, a server device configured to control a client device includes a communicator configured to obtain context data indicating a circumstance of a user from a first client device; and a controller configured to determine an event by comparing the obtained context data and pre-stored user information, wherein the communicator may be further configured to transfer information about an object that is output from the server device to a second client device, based on the determined event.

When the determined event is a first event, the controller may be further configured to generate a mirroring session for performing a mirroring service in which the information about the object that is output from the server device is transferred to the second client device, and the communicator is further configured to transfer the information about the object t to the second client device using the generated mirroring session.

The communicator may be further configured to obtain the context data from the first client device, according to a pre-configured cycle, and the pre-configured cycle may be changed based on the event.

The controller may be further configured to determine a movement of the user from the obtained context data, and predict the event generated for the user, based on the determined movement of the user.

The controller may be further configured to determine an operation corresponding to the determined event, using an application that is executed when the event is determined, and change the object that is output in the server device, according to the determined operation, and the communicator may be further configured to transfer information about the changed object to the second client device.

The pre-stored user information may include information indicating a relation between the event and the obtained context data.

The controller may be further configured to generate a pattern of context data corresponding to the event, based on input information corresponding to the event obtained by the server device from the user, and context data obtained at a time corresponding to the event.

The communicator may be further configured to obtain the context data from the first client device at a detection time, and the detection time may be a time when the server device senses the second client device.

The controller may be further configured to determine whether the user is a pre-registered user using the obtained context data.

A non-transitory computer-readable recording medium may have embodied thereon a computer program for executing the methods disclosed herein.

According to a further aspect of an exemplary embodiment, a method of controlling a client device includes obtaining, from a first client device, context data indicating a circumstance of a user; determining an event by comparing the context data and pre-stored user information; and transferring information to a second client device, based on the determined event.

The information may include content to be displayed by the second client device.

The information may be a command instructing the second client device to execute an application.

Determining the event may further include determining an application that is being executed when the context data is received, and determining the event based on the application, the context data, and the pre-stored user information.

BRIEF DESCRIPTION OF THE DRAWINGS

The above and other aspects of the exemplary embodiments will become apparent and more readily appreciated from the following description of the exemplary embodiments, taken in conjunction with the accompanying drawings in which.

DETAILED DESCRIPTION

Figure 1:
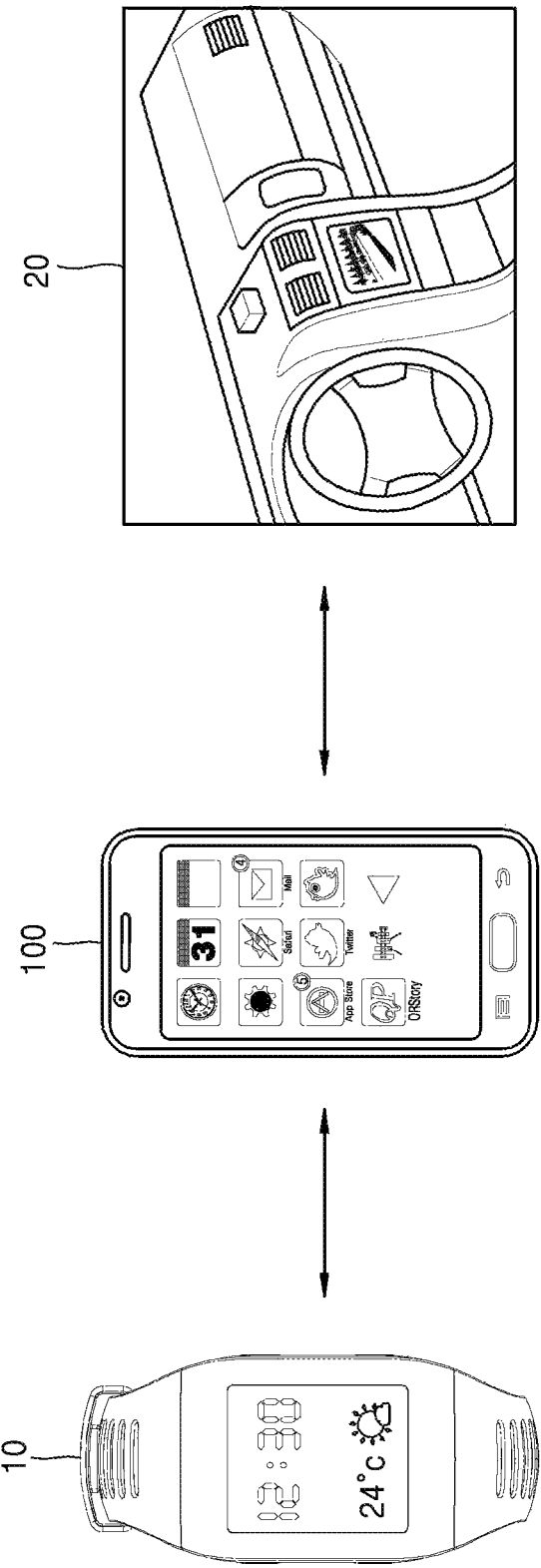
FIG. 1 is a conceptual view for describing a method of controlling another device via a device, according to an exemplary embodiment.

The terms used in the specification will be briefly defined, and the exemplary embodiments will be described in detail.

The terms used in this specification are those general terms currently widely used in the art in consideration of functions regarding the exemplary embodiments, but the terms may vary according to the intention of those of ordinary skill in the art, precedents, or new technology in the art. Also, some terms may be arbitrarily selected by the applicant, and in this case, the meaning of the selected terms will be described in detail in the detailed description of the present specification. Thus, the terms used in the specification should be understood not as simple names but based on the meaning of the terms and the overall description of the exemplary embodiments.

When a part "includes" or "comprises" an element, unless there is a particular description contrary thereto, the part can further include other elements, not excluding the other elements. In addition, terms such as " . . . unit," " . . . module," or the like refer to units that perform at least one function or operation, and the units may be implemented as hardware or software or as a combination of hardware and software.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

FIG. 1 is a conceptual view for describing a method of controlling a device 10 or a device 20 via a device 100, according to an exemplary embodiment.

Referring to FIG. 1, the device 100 may perform communication with the first device 10 and the second device 20. The device 100 may obtain data related to a user from the first device 10. Hereinafter, the device 100, which may execute an application based on the obtained data, will be referred to as the server device 100, and the first device 10, which transfers the data related to the user to the server device 100 will be referred to as the first client device 10.

The first client device 10 may include, for example, a wearable device which is wearable by a user. The first client device 10 may obtain the data related to the user, at a location proximate to the user. For example, the first client device 10 may obtain context data indicating a circumstance of the user.

The context data may include, for example, data related to a user's location, a user's speed, and a user's moving direction. According to another exemplary embodiment, the context data may include data related to a distance between the user and an object (for example, a vehicle). However, these are only exemplary embodiments, and the context data is not limited to the examples above. The context data may include at least one type of data which may be used for predicting the circumstance of the user, from among data obtained from a sensor included in the server device 100.

The server device 100 may transfer information about an object that is output as a result of executing the application in the server device 100, to the second device 20. Here, the service in which the server device 100 transfers the information about the object that is output to the second device 20 may include a mirroring service in which the server device 100 transfers a displayed screen to the second device 20. The second device 20 that receives the information about the object that is output via the server device 100 will be referred to as the second client device 20.

When the mirroring service is executed between the server device 100 and the second client device 20, the server device 100 may transfer the information about the object that is output as a result of the execution of the application, to the second client device 20. Throughout the specification, the term "application" denotes a group of computer programs designed for performing a specific operation. The application described in this specification may vary. For example, the application may be a messenger application, a telephone application, a music playing application, a game application, or a video application, but the application is not limited thereto.

Meanwhile, the term "object" in this specification refers to an object which may be displayed on the device and manipulated or defined by the user.

For example, the object may be an application execution image, content, a figure or an object indicated in a content execution image, or an icon indicated in an application execution image. The application refers to a program that outputs a pre-determined result when receiving a pre-determined input from a device. The content refers to a file of content itself which may be executed by a pre-determined application. The content may include an image, a video, a text, etc. The figure, the object, or the icon refers to a figure, an object, or an icon displayed on a screen of the device when the content or the application is executed.

Also, the information about the object may include the application execution image or meta data about the content. For example, when the object is the application execution image, the information about the object may include a name of the application (for example, a google map or a google player), content of a service provided by the application (for example, a map searching service or a content playing service), an input format of the application (for example, a format or a size of a file), and identification information of the application which may enable the device to distinguish the application from others.

In some exemplary embodiments, when the object is the content, the information about the object may include a file name of the content, an access URL, a format of the content file, a size of the content file, etc. In other exemplary embodiments, when the object is the figure or the object indicated in the content execution image, the information about the object may include a name of the figure or the object or a type of the figure or the object. In further exemplary embodiments, when the object is the icon indicated in the content execution image, the information about the object may include a symbolized meaning of the icon and content executed when the icon is manipulated.

FIG. 1 illustrates only an exemplary embodiment. In other exemplary embodiments, the mirroring service may be performed between a plurality of server devices and a plurality of second client devices. At least one of the plurality of server devices and at least one of the plurality of second client devices may perform the mirroring service by being connected to each other in a 1:1 connection format, a 1:N connection format, or a N:N connection format.

The server device 100, the first client device 10, and second client device 20 may perform wired or wireless communication. For example, the server device 100 and the first and second client devices 10 and 20 may be interconnected according to various communication networks standards, such as a local area network (LAN), a wide area network (WAN), a wireless LAN (WLAN), a wireless broadband (Wibro), CDMA, WCDMA, and near field communication (NFC).

The server device 100 and the first and second client devices 10 and 20 may be devices, such as a tablet, a smart phone, a head-unit, a smart television (TV), a smart watch, a smart glasses, a personal computer (PC), and a laptop. In this specification, for convenience of explanation, the server device 100 will be referred to as a smart phone, the first client device 10 as a wearable device, such as a smart watch or a smart glass, and the second client device 20 as a head-unit for a vehicle. This is only for convenience of understanding, and devices to which the present description may be applied are not limited to the smart phone, the wearable device, and the vehicle head-unit.

Hereinafter, a method of controlling the first and second client devices 10 and 20 via the server device 100 will be described with reference to FIG. 2.

Figure 2:
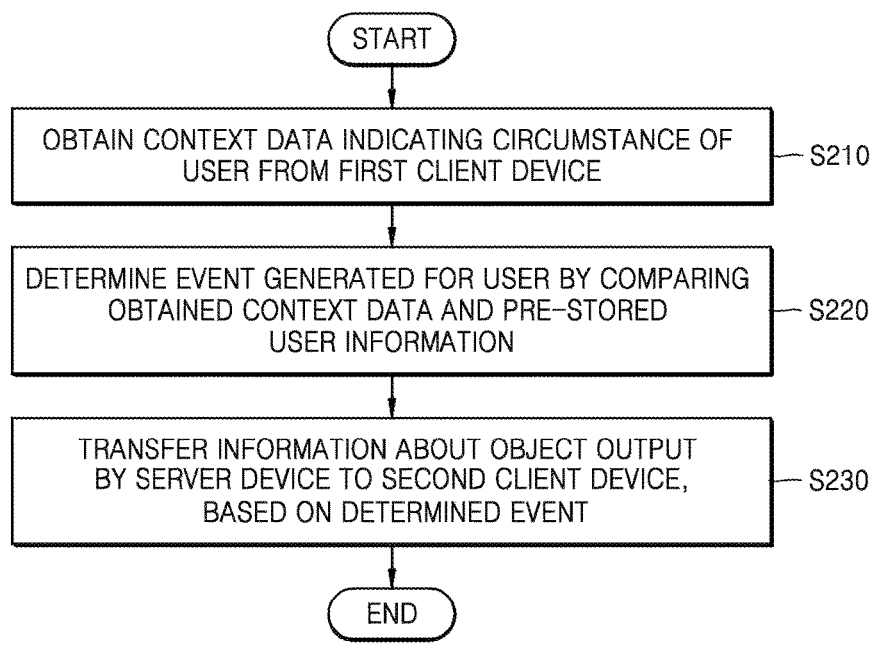
FIG. 2 is a flowchart illustrating a method of controlling a client device via a server device, according to an exemplary embodiment.

FIG. 2 is a flowchart illustrating an exemplary method of controlling the first and second client devices 10 and 20 via the server device 100, according to an exemplary embodiment.

The server device 100 obtains context data indicating a circumstance of a user from the first client device 10, in operation S210.

The server device 100 may configure a session for performing communication with the first client device 10. Also, the server device 100 may determine a start point of obtaining the context data, according to a configuration set by the user. For example, the server device 100 may automatically obtain the context data from the first client device 10 without receiving an additional input signal from the user. According to another exemplary embodiment, if the server device 100 obtains the input signal from the user, the server device 100 may obtain the context data from the first client device 10, according to a pre-configured cycle. According to another exemplary embodiment, the server device 100 may obtain the context data from the first client device 10 if the condition configured by the user is met. For example, if the second client device 20 is sensed within a pre-determined range of distance, the server device 100 may obtain the context data from the first client device 10.

The server device 100 according to an exemplary embodiment may obtain the context data from the first client device 10, according to a pre-configured cycle. Here, the pre-configured cycle may be determined based on an event generated for the user, which is determined based on context data that the first client device 10 obtained from the user.

This aspect will be described in further detail below, with reference to FIG. 5. Here, the event refers to a specific situation for controlling the second client device 20 via the server device 100, from among situations which may be generated for the user.

The server device 100 determines an event generated for the user by comparing the obtained context data and pre-stored user information, in operation S220. The pre-stored user information may include information about a pattern of context data corresponding to an event. When an event is generated, the server device 100 may determine an object that is output in the server device 100. Here, the event may vary according to configurations. For example, the event may include an event of a user getting into a vehicle, an event of a user starting to drive the vehicle, an event of a user changing a speed of the vehicle while driving the vehicle, an event of a user finishing driving the vehicle, etc. However these are only examples and the event is not limited thereto.

The server device 100 transfers information about an object that is output to the second client device 20, based on the determined event, in operation S230.

When an event is generated, the server device 100 may transfer the information about the object that is output by the server device 100 to the second client device 20. For example, when the event of the user getting in the vehicle is generated, the server device 100 may transfer information for executing the mirroring service to the second client device 20. According to another exemplary embodiment, when the event of the user starting to drive the vehicle is generated, the server device 100 may transfer a map image that is output according to an execution of a navigation application, to the second client device 20.

Figure 3:
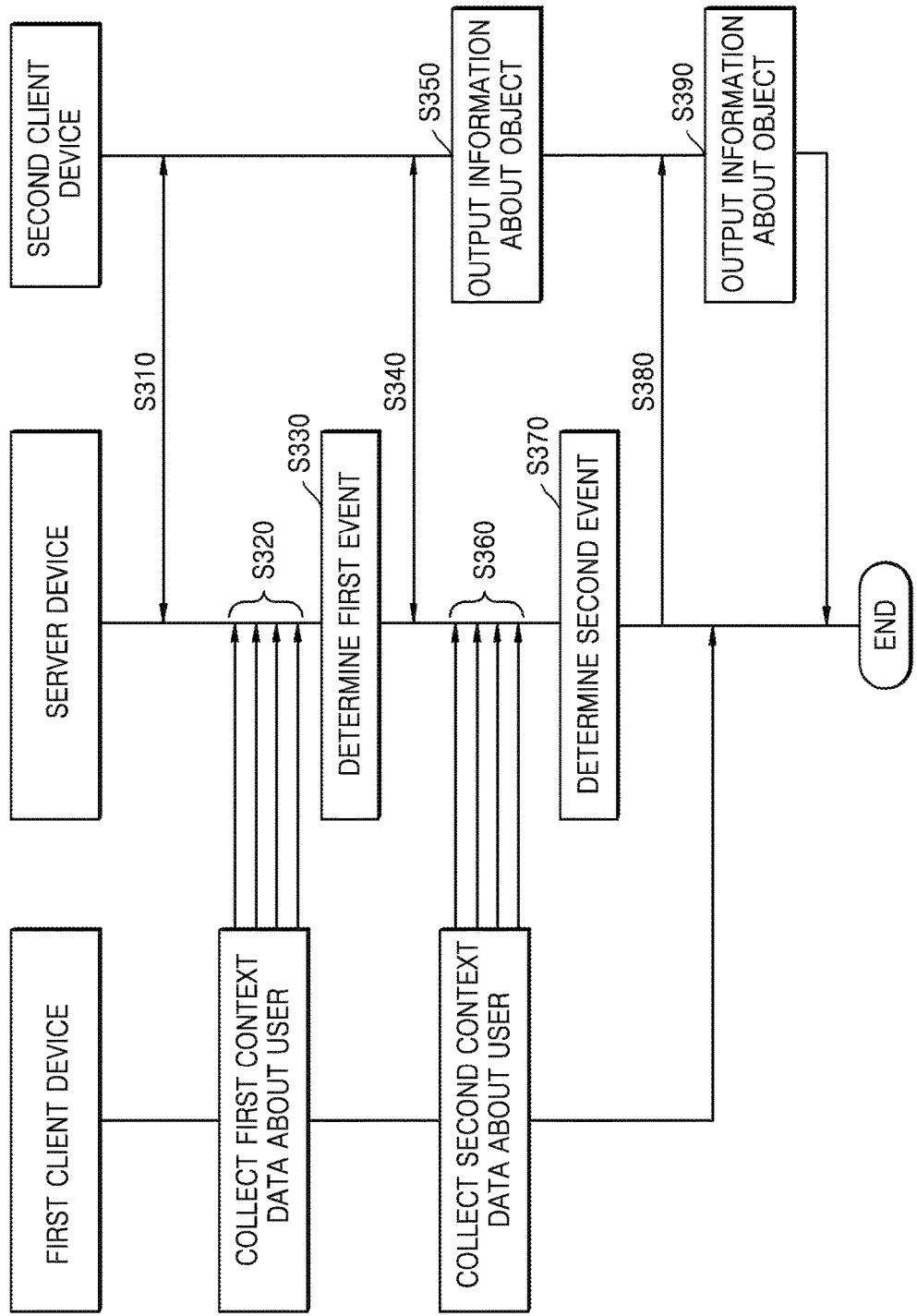
FIG. 3 is a view for describing a method of performing a mirroring service by controlling a first client device and a second client device, via a server device, according to an exemplary embodiment.

FIG. 3 is a view for describing a method of performing a mirroring service by controlling the first client device 10 and the second client device 20 via the server device 100, according to an exemplary embodiment.

The server device 100 may sense the second client device 20 in operation S310. For example, the server device 100 may sense that the second client device 20 is located within a radius of a from the server device 100.

The first client device 10 may transfer first context data indicating a circumstance of a user to the server device 100, in operation S320. The first client device 10 according to an exemplary embodiment may transfer the first context data to the server device 100, when the server device 100 senses the second client device 20. The first client device 10 may transfer the first context data to the server device 100 according to a pre-configured cycle.

The server device 100 may determine a first event generated for the user, by comparing the first context data and pre-stored user information, in operation S330. For example, the server device 100 may predict a generation of the first event that the user starts driving a vehicle, as a result of comparing the first context data and the pre-stored user information.

The server device 100 may configure a mirroring session with the second client device 20, based on the first event that is determined, in operation S340. For example, when the event of driving the vehicle is generated, the server device 100 may transfer session information for configuring the mirroring session, to the second client device 20, as the information about the object. The session information for configuring the mirroring session may include information about the OS, IP, and port lists of the server device 100. However, this is only an exemplary embodiment, and the present inventive concept is not limited thereto.

The second client device 20 may output information indicating that the mirroring session is configured between the server device 100 and the second client device 20, in operation S350. Also, the second client device 20 may output a list of applications which are capable of performing the mirroring service, received from the server device 100.

The server device 100 may obtain second context data indicating a circumstance of the user from the first client device 10, in operation S360. In some exemplary embodiments, the server device 100 may continuously receive context data from the first client device 10, after the first event corresponding to the first context data previously obtained is determined.

The server device 100 may determine a second event generated for the user, by comparing the second context data that is obtained and the pre-stored user information, in operation S360.

The server device 100 may transfer the information about the object that is output by the server device 100 to the second client device 20, based on the second event that is determined, in operation S370.

The second client device 20 may output the information about the object, which is received, in operation S380. For example, the second client device 20 may receive information about a screen displayed in the server device 100 and output the information.

Figure 4:
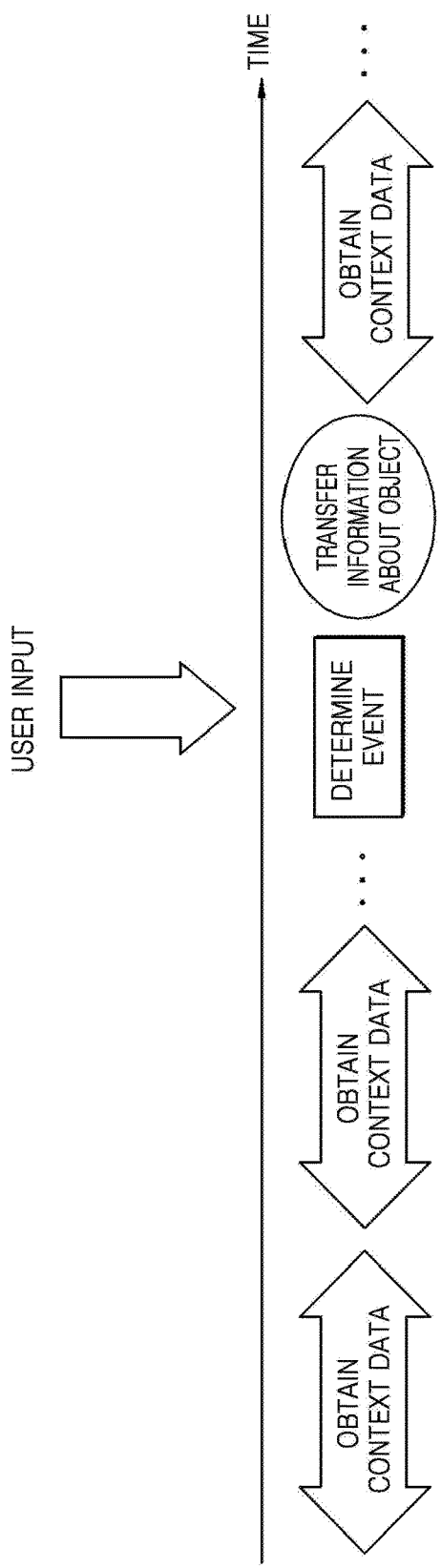
FIG. 4 is a view for describing a method of generating user information that is used for determining an event, via a server device, according to an exemplary embodiment.

FIG. 4 is a view for describing a method of generating user information that is used for determining an event, via the server device 100, according to an exemplary embodiment.

The server device 100 may repeatedly obtain context data from the first client device 10, according to a pre-configured cycle. The server device 100 may generate information about a pattern of context data corresponding to an event, to determine the event generated for the user, by using the obtained context data.

Referring to FIG. 4, the server device 100 may predict the event generated for the user based on input information that is input by the user to control the server device 100 at a pre-determined point in time. Also, the server device 100 may analyze a pattern of context data which is obtained from a point in time at which the input information is received from the user until a pre-determined point in time. For example, in FIG. 4, the server device 100 may generate the user information by matching the analyzed pattern of the context data with the predicted event. Meanwhile, the server device 100 may transfer information about an object that is output by performing an operation corresponding to the determined event, to the second server device 20.

According to an exemplary embodiment, the user information generated via the server device 100 may be used later to determine an event generated for the user, via the server device 100. The server device 100 may compare newly obtained context data with the pattern of the context data stored in the user information. When context data of a first pattern corresponding to the obtained context data is stored in the user information, the server device 100 may determine that an event corresponding to the context data of the first pattern is generated.

Figure 5:
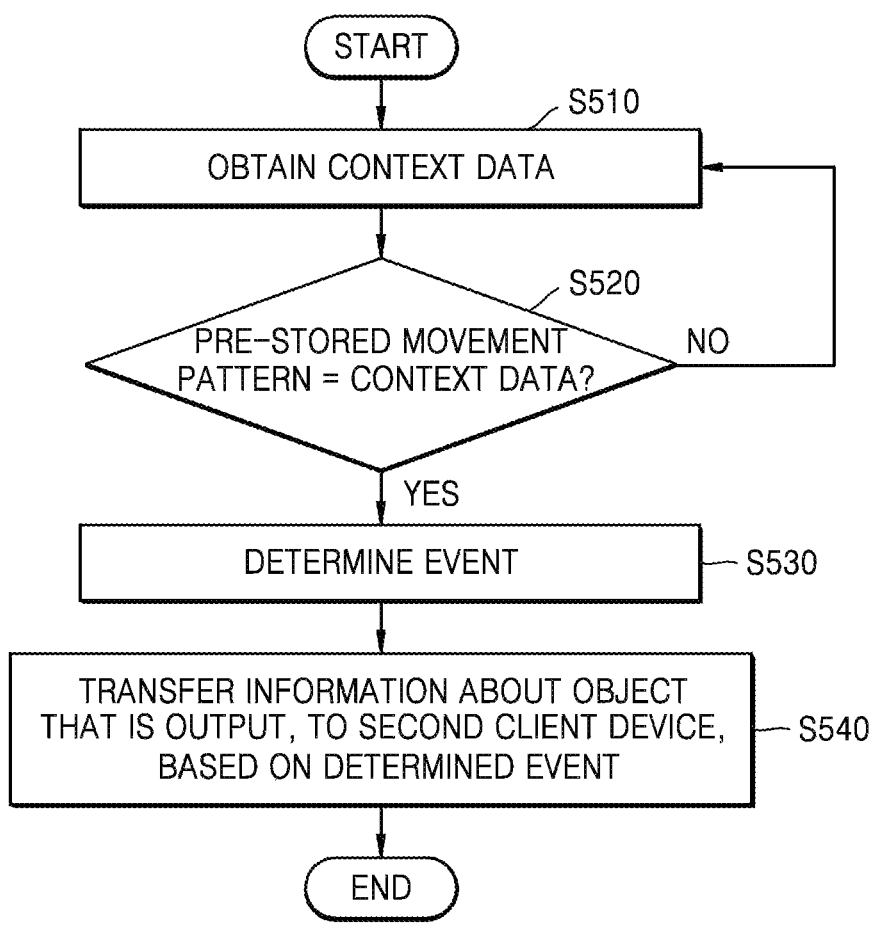
FIG. 5 is a flowchart illustrating a method of transferring information about an object to a second client device, via a server device, according to an event generated for a user, according to an exemplary embodiment.

FIG. 5 is a flowchart illustrating a method of transferring information about an object to the second client device 20, via the server device 100, according to an event generated for a user, according to an exemplary embodiment.

The server device 100 may obtain context data indicating a circumstance of a user from the first client device 10, in operation S510. The server device 100 may configure a session for performing communication with the first client device 10. The server device 100 according to an exemplary embodiment may obtain the context data from the first client device 10, according to a pre-configured cycle.

In some exemplary embodiments, operation S510 may correspond to operation S210 that is described above with reference to FIG. 2.

The server device 100 may determine whether the obtained context data corresponds to a movement pattern that is stored in user information, in operation S520.

The server device 100 may store the user information including information about the movement pattern of the user. The movement pattern refers to information that is generated by using at least one of a user's location, a user's moving direction, a user's moving gesture, and a user's moving speed, when a plurality of events are respectively generated.

For example, when the user starts driving a vehicle, the server device 100 may generate the movement pattern based on information about a direction of a body of the user moving to hold a handle, a hand gesture of the user to hold the handle, and a location of the user in a vehicle. According to another exemplary embodiment, when the user finishes driving the vehicle and starts parking the vehicle, the server device 100 may generate the movement pattern based on information about a direction of the body of the user moving to watch a rear mirror or a side mirror and a hand gesture of the user to change a gear.

The server device 100 may determine an event generated for the user, corresponding to a movement pattern, in operation S530. When the obtained context data corresponds to the movement pattern at a ratio that is equal to or higher than a threshold ratio, the server device 100 may predict that the event corresponding to the movement pattern is generated for the user. The server device 100 may determine that the predicted event is generated for the user.

The server device 100 may transfer the information about the object that is output by the server device 100 to the second client device 20, based on the determined event, in operation S540. The server device 100 may transfer the information about the object that is output by the server device 100 to the second client device 20, when an event is generated.

In some exemplary embodiments, operation S540 may correspond to operation S230 that is described above with reference to FIG. 2.

Figure 6:
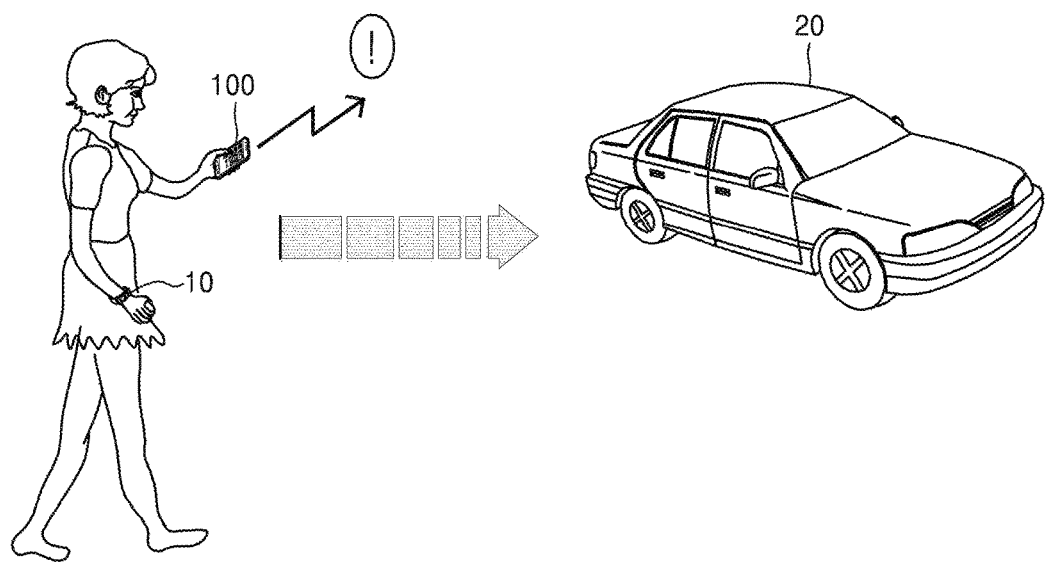
FIG. 6 is a view for describing a method of changing a cycle of obtaining context data from a first client device, via a server device, according to an exemplary embodiment.

FIG. 6 is a view for describing a method of changing a cycle of obtaining context data from the first client device 10, via the server device 100, according to an exemplary embodiment.

The first client device 10 may obtain the context data indicating a circumstance of a user, according to a pre-configured cycle. The pre-configured cycle may be determined based on an event generated for the user, which is determined based on context data that the first client device 10 has previously obtained from the user.

Referring to FIG. 6, the server device 100 may change the pre-configured cycle, based on a distance between the user and the second client device 20, when the user approaches an object (for example, a vehicle) including the second client device 20 to operate the object.

For example, the server device 100 may obtain the context data from the first client device 10, when the second client device 20 is located within a radius of a from a location of the user. The server device 100 may obtain the context data at an interval of, for example, ten seconds, which may be a cycle pre-configured as a default value.

Meanwhile, the server device 100 may shorten the cycle of obtaining the context data, the nearer the user is to the vehicle including the second client device 20. For example, when the distance between the user and the second client device 20 is lessened to a radius of a/2, the server device 100 may change the cycle of obtaining the context data to five seconds.

Figure 7:
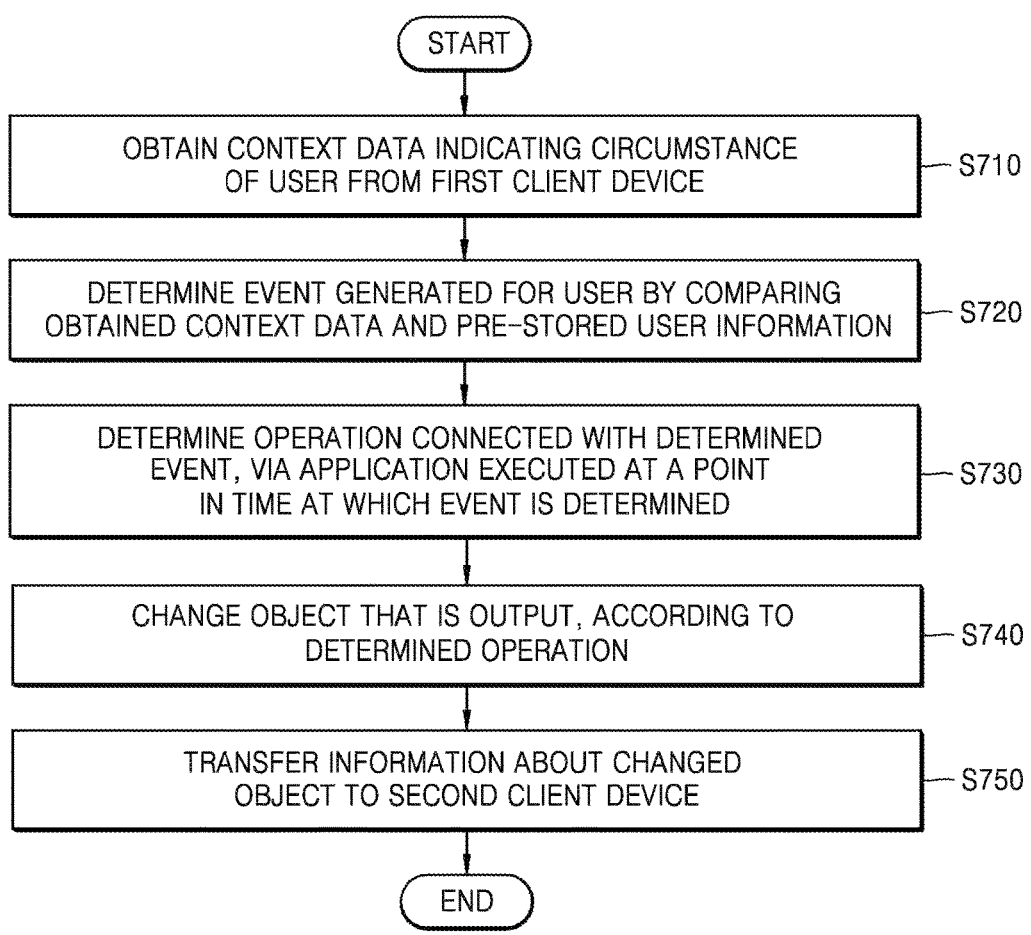
FIG. 7 is a flowchart illustrating a method of determining information about an object that is transferred to a second client device, via a server device, based on an executed application and a determined event, according to an exemplary embodiment.

FIG. 7 is a flowchart illustrating a method of determining information about an object that is to be transferred to the second client device 20, via the server device 100, based on an executed application and a determined event, according to an exemplary embodiment.

The server device 100 may obtain context data indicating a circumstance of a user from the first client device 10, in operation S710. The server device 100 may configure a session for performing communication with the first client device 10. The server device 100 according to an exemplary embodiment may obtain the context data from the first client device 10, according to a pre-configured cycle.

In some exemplary embodiments, operation S710 may correspond to operation S210 that is described above with reference to FIG. 2.

The server device 100 may determine an event that is generated for the user, by comparing the obtained context data and pre-stored user information, in operation S720. The pre-stored user information may include information about a pattern of context data corresponding to an event.

The server device 100 may determine an operation corresponding to an event that is determined via an application executed in the server device 100 at a point in time at which the event is determined, in operation S730. The operation that is to be performed based on the determined event may vary according to types of the application executed in the server device 100. For example, when the server device 100 executes a telephone application, the server device 100 may determine an operation of connecting a received call to the user, if the event of the user stopping driving the vehicle is determined. Meanwhile, when the server device 100 executes a navigation application, the server device 100 may determine an operation of finishing the navigation application, if the event of stopping driving the vehicle is determined.

The server device 100 may change the object that is output in the server device 100, according to the determined operation, in operation S740.

For example, when the server device 100 executes the telephone application, the device 100 may change the object to be a notification of a received call, to connect the received call to the user, if the event of the user stopping driving the vehicle is determined. In some exemplary embodiments, when the server device 100 executes the navigation application, the server device 100 may change the object to be a command for ending the navigation application, if the event of the user stopping driving the vehicle is determined.

The server device 100 may transfer information about the changed object to the second client device 20, in operation S750. For example, the server device 100 may transfer the notification about the call to the second client device 20. According to another exemplary embodiment, the server device 100 may transfer a screen image of the server client device 100 in which the navigation application is ended, to the second client device 20.

The method of transferring the information about the changed object to the second client device 20, via the server device 100, according to the present exemplary embodiment, may correspond to operation S230 that is described above with reference to FIG. 2.

Figure 8:
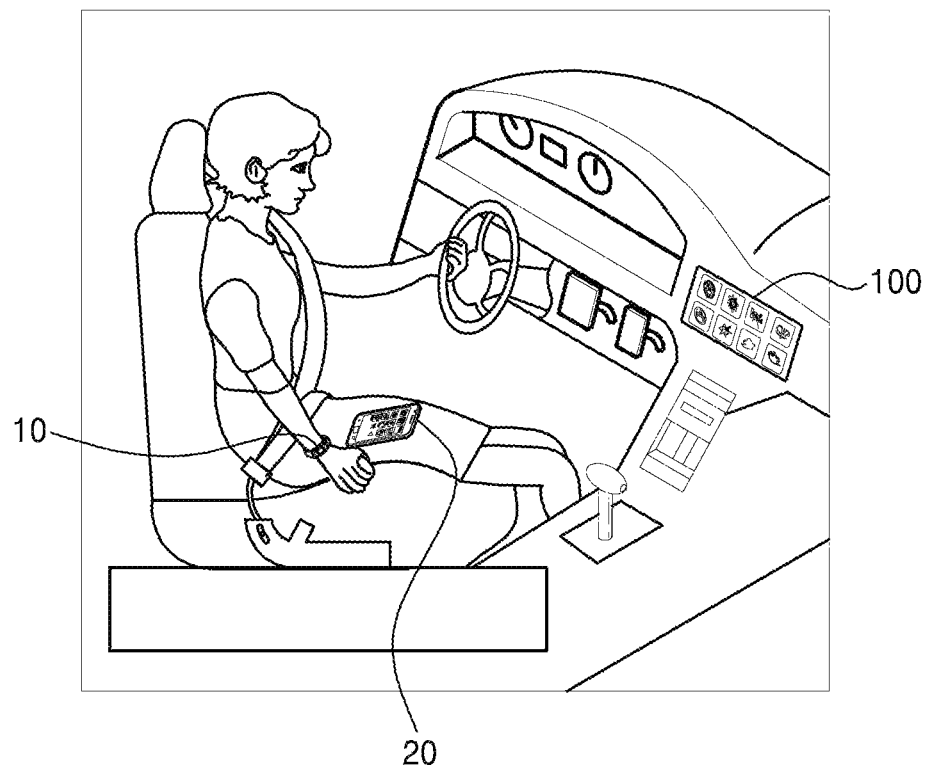
FIG. 8 is a view for describing a method of transferring information about an object to a second client device, via a server device, based on context data obtained from a first client device, when a user starts driving a vehicle, according to an exemplary embodiment.

FIG. 8 is a view for describing a method of transferring information about an object to the second client device 20, via the server device 100, based on context data obtained from the first client device 10, when a user starts driving a vehicle, according to an exemplary embodiment.

The server device 100 may obtain the context data indicating a circumstance of a user from the first client device 10, according to a pre-configured cycle. The server device 100 may determine whether the obtained context data corresponds to a movement pattern stored in user information.

Referring to FIG. 8, the first client device 10 may be worn at a wrist of the user. When the user moves to hold a handle, wears a safety belt, or changes a gear to start a vehicle, the first client device 10 may obtain information about a changed position of the user and a movement of the user, at a location proximate to the user, according to the pre-configured cycle. The server device 100 may determine whether the obtained information corresponds to the movement pattern stored in the user information.

When the movement pattern corresponding to an event of the user starting driving the vehicle corresponds to the obtained context data, the server device 100 may determine that the user starts driving the vehicle.

The server device 100 may transfer the information about the object that is output by the server device 100 to the second client device 20, based on the determined event. For example, when the user starts driving the vehicle, the server device 100 may transfer a screen on which a navigation application is executed to the second client device 20.

Figure 9:
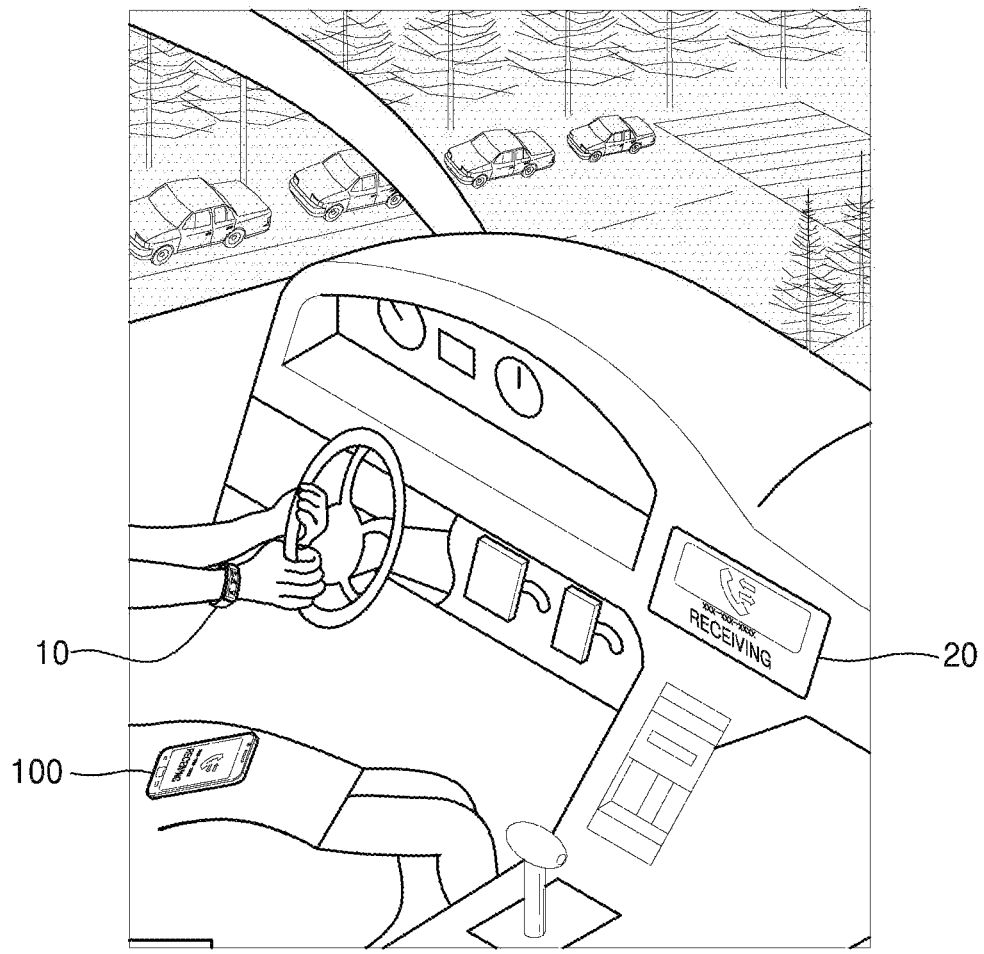
FIG. 9 is a view for describing a method of transferring information about an object to a second client device, via a server device, based on context data obtained from a first client device, while a user is driving a vehicle, according to an exemplary embodiment.

FIG. 9 is a view for describing a method of transferring information about an object to the second client device 20, via the server device 100, based on context data obtained from the first client device 10, while a user is driving a vehicle, according to an exemplary embodiment.

Referring to FIG. 9, the first client device 10 may be worn at a wrist of the user. When the user operates an accelerator pedal or changes gears, the first client device 10 may obtain information about a changed position of the user and a movement of the user, at a location proximate to the user, according to the pre-configured cycle. The server device 100 may determine whether the obtained information corresponds to the movement pattern stored in the user information.

When the movement pattern corresponding to an event of the user driving the vehicle corresponds to the obtained context data, the server device 100 may determine that the user drives the vehicle.

The server device 100 may transfer the information about the object that is output by the server device 100 to the second client device 20, based on the determined event. For example, when a request to answer a call is received while the user drives the vehicle, the server device 100 may transfer a call rejection message, without receiving an additional user input. Also, the server device 100 may transfer the result of transferring the call rejection message and information of a caller that sent the request of the call, to the second client device 20.

Figure 10:
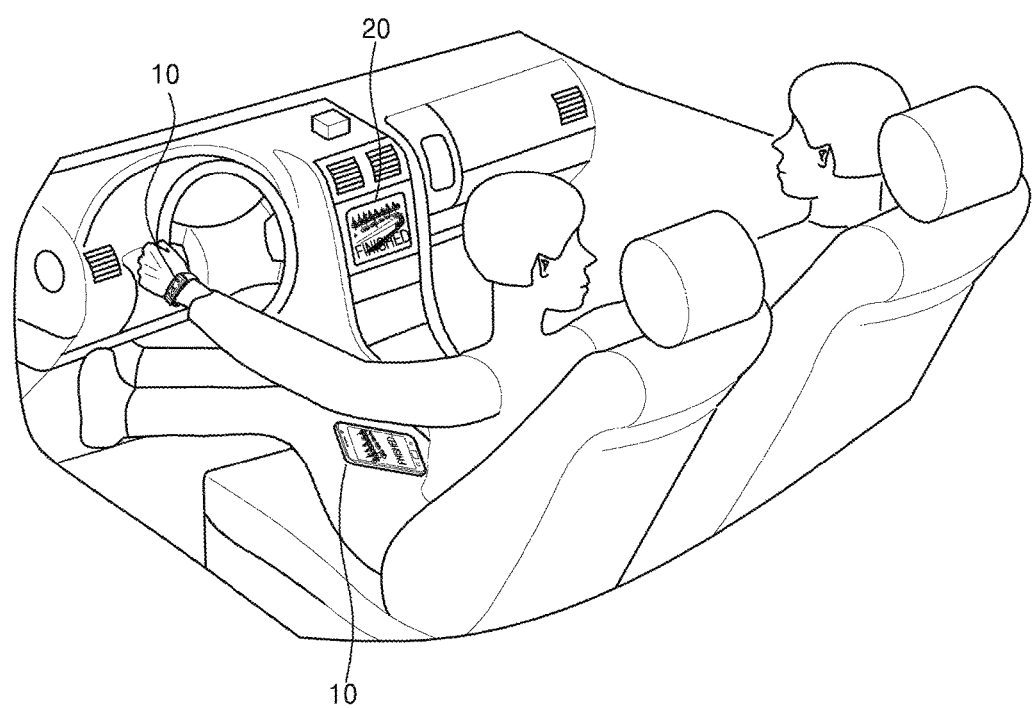
FIG. 10 is a view for describing a method of transferring information about an object to a second client device, via a server device, based on context data obtained from a first client device, when a user finishes driving a vehicle, according to an exemplary embodiment.

FIG. 10 is a view for describing a method of transferring information about an object to the second client device 20, via the server device 100, based on context data obtained from the first client device 10, when a user finishes driving a vehicle, according to an exemplary embodiment.

Referring to FIG. 10, the first client device 10 may be worn at a wrist of the user. When the user turns his/her head to park the vehicle or takes off the safety belt, the first client device 10 may obtain information about a changed position of the user and a movement of the user, at a location proximate to the user, according to the pre-configured cycle.

When a movement pattern corresponding to an event of the user finishing driving the vehicle corresponds to the obtained context data, the server device 100 may determine that the user finishes driving the vehicle.

The server device 100 may transfer the information about the object that is output in the server device 100 to the second client device 20, based on the determined event. For example, when the user finishes driving the vehicle, the server device 100 may transfer information about a screen on which the navigation application is ended to the second client device 20. According to another exemplary embodiment, when the user finishes driving the vehicle, the server device 100 may transfer information for ending the mirroring session connected between the second client device 20 and the server device 100, to the second client device 20.

Figure 11:
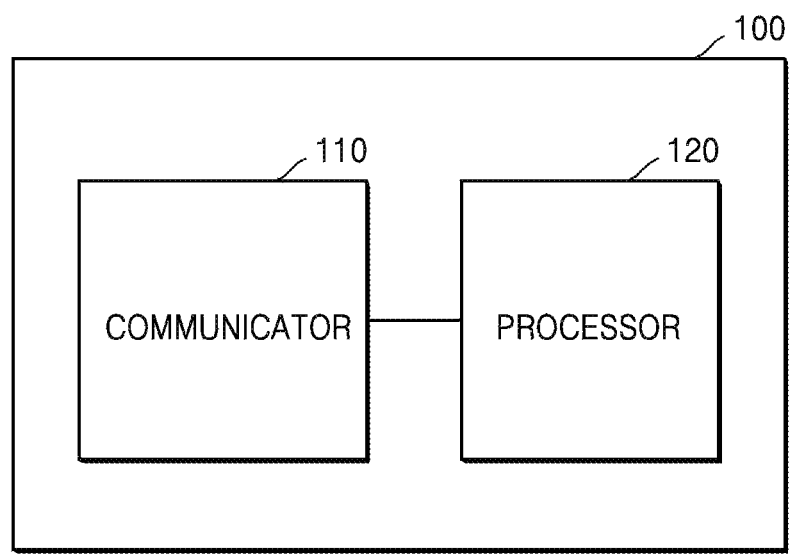
FIGS. 11 and 12 are block diagrams of a configuration of a device, according to an exemplary embodiment.
Figure 12:
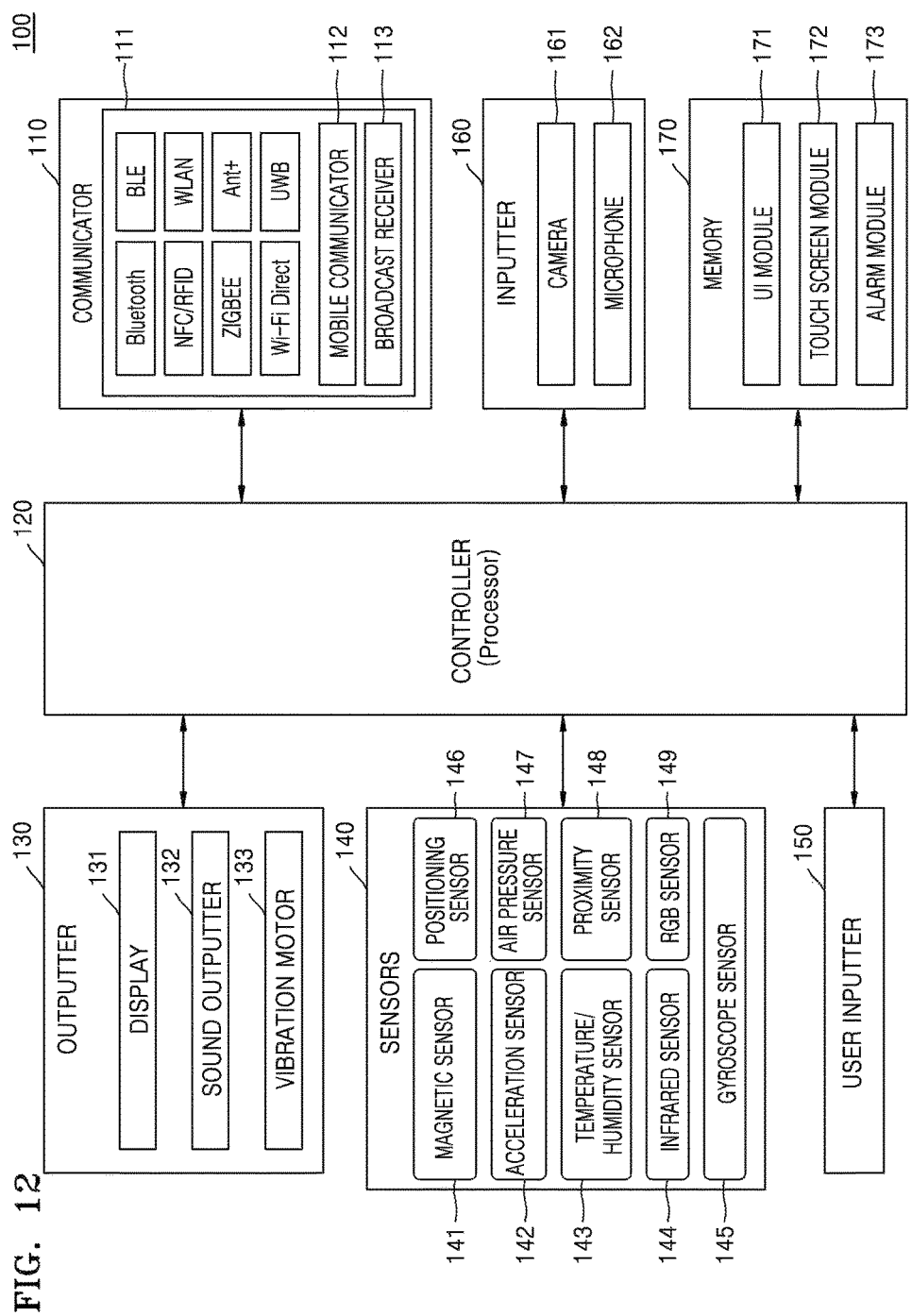

FIGS. 11 and 12 are block diagrams of a configuration of the device 100.

As illustrated in FIG. 11, the device 100 according to an exemplary embodiment may include a communicator 110 and a controller 120. The device 100 may be realized by using more or fewer components than the illustrated components.

For example, as illustrated in FIG. 12, the device 100 may further include a sensors 140, an inputter 150, an audio/video (A/V) inputter 160, and a memory 170, in addition to the communicator 110 and the controller 120.

Hereinafter, these components will be described.

The communicator 110 obtains context data indicating a user's circumstance from the first client device 10. Also, the communicator 110 may transfer information about an object that is output by the server device 100 to the second client device 20, based on an event determined by the controller 120.

The communicator 110 may transfer the information about the object that is output to the second client device 20, by using a mirroring session generated between the server device 100 and the second client device 20.

The communicator 110 may obtain the context data from the first client device 10, according to a pre-configured cycle, and the pre-configured cycle may be determined based on context data that is previously obtained.

When the object that is output by the server device 100 is changed, according to the event generated for the user, the communicator 110 may transfer information about the changed object to the second client device 20.

Meanwhile, the communicator 110 may start obtaining the context data from the first client device 10 at a point in time at which the server device 100 senses the second client device 20.

The communicator 110 according to an exemplary embodiment may include one or more components that enable communication between the device 100 and an external device or between the device 100 and a server. For example, the communicator 110 may include a short-range wireless communicator 111, a mobile communicator 112, and a broadcasting receiver 113.

Examples of the short-range wireless communicator 111 may include a Bluetooth communicator, a Bluetooth low energy communicator, a near field communicator, a WLAN (WiFi) communicator, a ZigBee communicator, an infrared data association (IrDA) communicator, a Wi-Fi direct (WFD) communicator, an ultra wideband (UWB) communicator, and an Ant+ communicator, but they are not limited thereto.

The mobile communicator 112 transfers and receives a wireless signal to and from at least one of a base station, an external device, and a server. Here, the wireless signal may include a sound call signal, a video telephony call signal, or various types of data according to text/multimedia message transferring and receiving.

The broadcasting receiver 113 receives broadcasting signals and/or information related to broadcasting from the outside via a broadcasting channel. The broadcasting channel may include at least one of a satellite channel, and a ground wave channel. According to exemplary embodiments, the device 100 may not include the broadcasting receiver 113.

The controller 120 controls general operations of the device 100, in general. For example, the controller 120 may control the inputter 150, an outputter 130, the sensors 140, the communicator 110, and the A/V inputter 160, by executing programs stored in the memory 170.

The controller 120 determines an event generated for the user by comparing the context data obtained by the communicator 110 and pre-stored user information. When the determined event is a first event, the controller 120 may perform a mirroring service in which information about an object that is output by the server device 100 is transferred to the second client device 20.

The controller 120 may transfer the information about the object that is output to the second client device 20, by using the generated mirroring session. The controller 120 may determine a movement of the user from the obtained context data, and may predict the event generated for the user based on the determined movement of the user.

The controller 120 may determine an operation connected with an event that is determined via an application executed at a point in time at which the event is determined, and may change the object that is output according to the determined operation.

Meanwhile, the controller 120 may generate a pattern of context data corresponding to an event generated at a pre-determined point in time, based on input information obtained via the server device from the user according to the event generated at the pre-determined point in time, and the context data obtained at the pre-determined point in time.

The controller 120 may obtain the context data from the first client device 10 at a point in time at which the server device 100 senses the second client device 20. The controller 120 may determine whether the user is a pre-registered user, by comparing the obtained context data with context data of the registered user.

The outputter 130 is configured to output audio signals, video signals, or vibration signals. The outputter 130 may include a display 131, a sound outputter 132, and a vibration motor 133.

The display 131 displays and outputs information processed by the device 100. In some exemplary embodiments, display 131 may output a result of performing the determined operation with respect to a target object 20, based on an obtained hovering input.

The display 131 may display an identification mark on content selected by a user from among at least one piece of content displayed in the device 100.

Meanwhile, when the display 131 and a touch pad are formed as a layered structure to realize a touch screen, the display 131 may be used not only as an output device but also as an input device. The display 131 may include at least one selected from a liquid crystal display, a thin film transistor-liquid crystal display, an organic light-emitting diode, a flexible display, a three-dimensional (3d) display, and an electrophoretic display (EPD). According to a realized shape of the device 100, the device 100 may include two or more displays 131. Here, the two or more displays 131 may be arranged to face each other by using a hinge.

The sound outputter 132 outputs audio data that is received from the communicator 110 or stored in the memory 170. Also, the sound outputter 132 outputs a sound signal related to a function (for example, an alarm sound) performed by the device 100. The sound outputter 132 may include a speaker, a buzzer, etc.

The vibration motor 133 may output a vibration signal. For example, the vibration motor 133 may output the vibration signal corresponding to an output of audio data or video data (for example, a call signal reception sound, a message reception sound, etc.). Also, the vibration motor 133 may output the vibration signal when the touch screen receives a touch input.

The sensors 140 may sense a state of the device 100 or a state around the device 100 and may transfer sensed information to the controller 120. For example, the sensors 140 may sense a user's referential operation and transfer the sensed information to the controller 120.

The sensors 140 may include at least one selected from a magnetic sensor 141, an accelerometer sensor 142, a temperature/humidity sensor 143, an infrared sensor 144, a gyroscope sensor 145, a position sensor (for example, GPS) 146, an atmospheric sensor 147, a proximity sensor 148, and an RGB sensor (illuminance sensor) 149, but the sensors 140 is not limited thereto. A function of each sensor may be instantly inferred by one of ordinary skill in the art in view of the name of each sensor, and thus, the function of each sensor will not be described in detail.

The inputter 150 refers to a device for inputting data for controlling the device 100. Examples of the inputter 150 include a key pad, a dome switch, a touch pad (using a touch-type capacitance method, a pressure-type resistive method, an infrared sensing method, a surface ultrasonic conductive method, an integral tension measuring method, a piezo effect method, etc.), a jog wheel, and a jog switch, but they are not limited thereto.

The A/V inputter 160 is configured for inputting an audio signal or a video signal, and may include a camera 161, a microphone 162, etc. The camera 161 may obtain a picture frame such as a still image or a video, by an image sensor, in a video telephony mode or a photographing mode. The image captured by the image sensor may be processed by the controller 120 or an additional image processor (not shown).

The picture frame processed by the camera 161 may be stored in the memory 170 or transferred to the outside via the communicator 110. Two or more cameras 161 may be included according to a realized shape of the device 100.

The microphone 162 may receive an external audio signal and process the received audio signal into an electrical audio signal. For example, the microphone 162 may receive a sound signal from an external device or a speaker. The microphone 162 may use various noise removal algorithms to remove noises generated in the process in which outside sound signals are received.

The memory 170 may store programs for processing and controlling of the controller 120, or may store input/output data (for example, a plurality of menus, a plurality of first hierarchical sub-menus respectively corresponding to the plurality of menus, a plurality of second hierarchical sub-menus respectively corresponding to the plurality of first hierarchical sub-menus.).

The memory 170 may include a recording medium of at least one of a flash memory type, a hard disk type, a multimedia card micro type, a card type memory (for example, an SD or an XD memory), random access memory (RAM), static random access memory (SRAM), read-only memory (ROM), electrically erasable programmable read-only memory (EEPROM), programmable read-only memory (PROM), a magnetic memory, a magnetic disk, and an optical disk. Also, the device 100 may operate a web storage performing the storing function of the memory 170 on the internet, or a cloud server.

The programs stored in the memory 170 may be divided into a plurality of modules according to their functions. For example, the programs may be divided into a UI module 171, a touch screen module 172, and a notification module 173.

The UI module 171 may provide a specialized UI, a GUI, etc. that are connected with the device 100, according to applications. The touch screen module 172 may sense a user's touching gesture on a touch screen and transfer information with respect to the touching gesture to the controller 120. The touch screen module 172 may recognize and analyze a touch code. The touch screen module 172 may be formed as separate hardware including a controller.

Various sensors may be included in the touch screen or around the touch screen to sense a touch or a proximity touch of the touch screen. An example of the sensor for sensing the touch of the touch screen is an antenna sensor. The antenna sensor refers to a sensor that senses a contact of a specific object, by a degree in which human beings sense or by a higher degree than the degree in which human beings sense. The antenna sensor may sense various information including a roughness of a contact surface, a rigidity of a contact object, and a temperature of a contact point.

Also, another example of the sensor for sensing the touch of the touch screen is the proximity sensor.

The proximity sensor refers to a sensor that senses an object that approaches a predetermined sensing surface or senses whether there is an object existing near the sensing surface by using an electromagnetic force or infrared rays, without a mechanical contact. Examples of the proximity sensor may include a transmittance photoelectricity sensor, a direct reflective photoelectricity sensor, a mirror-reflective photoelectricity sensor, a radio frequency oscillation proximity sensor, a capacitance proximity sensor, a magnetic proximity sensor, an infrared proximity sensor, etc. The touch gesture of the user may include tapping, touch & hold, double tapping, dragging, panning, flicking, drag and drop, and swiping.

The notification module 173 may generate signals for informing of an event occurrence of the device 100. Examples of the event occurring in the device 100 may include reception of call signals, reception of messages, occurrence of messages, inputting of key signals, and notifying of schedules. The notification module 173 may output a notifying signal as a video signal via the display 131, as an audio signal via the sound outputter 132, or as a vibration signal via the vibration motor 133.

The method of the exemplary embodiments may be implemented as computer instructions which may be executed by various computer means, and recorded on a computer-readable recording medium. The computer-readable recording medium may include program commands, data files, data structures, or a combination thereof. The program commands recorded on the computer-readable recording medium may be specially designed and constructed for the exemplary embodiments or may be known to and usable by one of ordinary skill in a field of computer software. Examples of the computer-readable medium include storage media such as magnetic media (e.g., hard discs, floppy discs, or magnetic tapes), optical media (e.g., compact disc-read only memories (CD-ROMs), or digital versatile discs (DVDs)), magneto-optical media (e.g., floptical discs), and hardware devices that are specially configured to store and carry out program commands (e.g., ROMs, RAMs, or flash memories). Examples of the program commands include a high-level language code that may be executed by a computer using an interpreter as well as a machine language code made by a complier.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made herein without departing from the spirit and scope as defined by the following claims.

What is claimed is:

1. A method of controlling a client device using a mobile device, the method comprising:
   receiving context data including information regarding a motion and a location of a user from a first client device;
   determining an event regarding a vehicle driving by comparing the received context data and pre-stored information, wherein the pre-stored information includes a pattern of a motion and a location of the user regarding the vehicle driving which has occurred;
   determining an object to be transferred from the mobile device to a second client device based on the determined event and a type of an application executed in the mobile device; and
   transferring the object to the second client device.

2. The method of claim 1, further comprises generating a mirroring session for performing a mirroring service to the second client device when the determined event is a first event, wherein the object is transferred to the second client device through the mirroring session.

3. The method of claim 1, wherein obtaining the context data comprises obtaining the context data from the first client device according to a pre-configured cycle, and
   the pre-configured cycle is changed based on the event.

4. The method of claim 1, wherein determining the object comprises:
   determining an operation of the application corresponding to the determined event;
   determining the object that is output from the mobile device, according to the determined operation.

5. The method of claim 1, wherein the pre-stored information comprises information indicating a relation between the event and the received context data.

6. The method of claim 1, further comprising generating a pattern of context data, based on an event which occurs on a previous time and context data obtained when the event of the previous time occurs.

7. The method of claim 1, further comprising detecting the second client device located in a pre-determined range from the mobile device,
wherein the mobile device obtains the context data from the first client device when the second client device is detected.

8. The method of claim 1, further comprising determining whether the user is a pre-registered user using the received context data.

9. A mobile device configured to control a client device, the mobile device comprising:
a communicator configured to receive context data including information regarding a motion and a location of a user from a first client device; and
a controller configured to determine an event regarding a vehicle driving by comparing the received context data and pre-stored information, wherein the pre-stored information includes a motion and a location of the user regarding the vehicle driving which has occurred and to determine an object to be transferred from the mobile device to a second client device based on the determined event and a type of an application executed in the mobile device,
wherein the communicator is further configured to transfer the object to the second client device.

10. The mobile device of claim 9, wherein the controller is configured to generate a mirroring session for performing a mirroring service to the second client device when the determined event is a first event, wherein the communicator transfers the object through the mirroring session.

11. The mobile device of claim 9, wherein the communicator is configured to obtain the context data from the first client device, according to a pre-configured cycle, and
the pre-configured cycle is changed based on the event.

12. The mobile device of claim 9, wherein the controller is configured to determine an operation of the application corresponding to the determined event, and to determine the object that is output from the mobile device, according to the determined operation.

13. The mobile device of claim 9, wherein the pre-stored information comprises information indicating a relation between the event and the received context data.

14. The mobile device of claim 9, wherein the controller is further configured to generate a pattern of context data, based on an event which occurs on a previous time and context data obtained when the event of the previous time occurs.

15. The mobile device of claim 9, wherein the controller is configured to detect the second client device located in a pre-determined range from the mobile device and to obtain the context data from the first client device when the second client device is detected.

16. The mobile device of claim 9, wherein the controller is configured to determine whether the user is a pre-registered user using the received context data.

17. A non-transitory computer-readable recording medium having embodied thereon a computer program for executing the method of claim 1.

* * * * *